United States Patent
Leue et al.

(10) Patent No.: US 7,609,807 B2
(45) Date of Patent: Oct. 27, 2009

(54) CT-GUIDED SYSTEM AND METHOD FOR ANALYZING REGIONS OF INTEREST FOR CONTRABAND DETECTION

(75) Inventors: William Macomber Leue, Albany, NY (US); Deborah Joy Walter, Burnt Hills, NY (US)

(73) Assignee: General Electric Company, Niskayuna, NY (US)

( * ) Notice: Subject to any disclaimer, the term of this patent is extended or adjusted under 35 U.S.C. 154(b) by 122 days.

(21) Appl. No.: 10/779,084

(22) Filed: Feb. 17, 2004

(65) Prior Publication Data
US 2005/0180542 A1 Aug. 18, 2005

(51) Int. Cl.
*G01N 23/04* (2006.01)
(52) U.S. Cl. .......................... 378/57; 378/4
(58) Field of Classification Search .......... 378/4, 378/57
See application file for complete search history.

(56) References Cited

U.S. PATENT DOCUMENTS

| | | | |
|---|---|---|---|
| 3,432,664 A | 3/1969 | Robison | |
| 3,518,433 A | 6/1970 | Owen | |
| 3,714,486 A | 1/1973 | McCrary | |
| 3,783,288 A | 1/1974 | Barbour et al. | |
| 4,200,800 A | 4/1980 | Swift | |
| 4,289,969 A | 9/1981 | Cooperstein et al. | |
| 5,115,394 A | 5/1992 | Walters | |
| 5,182,764 A * | 1/1993 | Peschmann et al. | 378/57 |
| 5,200,626 A | 4/1993 | Schultz et al. | |
| 5,247,561 A | 9/1993 | Kotowski | |
| 5,367,552 A * | 11/1994 | Peschmann | 378/57 |
| 5,491,734 A | 2/1996 | Boyd et al. | |
| 5,600,303 A * | 2/1997 | Husseiny et al. | 378/57 |
| 5,642,393 A * | 6/1997 | Krug et al. | 378/57 |
| 5,784,481 A | 7/1998 | Hu | |
| 6,088,423 A * | 7/2000 | Krug et al. | 378/57 |
| 6,115,448 A | 9/2000 | Hoffman | |
| 6,207,958 B1 | 3/2001 | Giakos | |
| 6,385,292 B1 | 5/2002 | Dunham et al. | |
| 6,418,189 B1 | 7/2002 | Schafer | |

(Continued)

FOREIGN PATENT DOCUMENTS

EP 1230950 B1 9/2002

(Continued)

OTHER PUBLICATIONS

"Three-Dimensional Multi-Scale Line Filter for Segmentation and Visualization of Curvilinear Structures in Medical Images,"Y. Sato et al., Medical Image Analysis (1998) vol. 2, No. 2, pp. 143-168.

*Primary Examiner*—Chih-Cheng G Kao
(74) *Attorney, Agent, or Firm*—Patrick K. Patnode

(57) ABSTRACT

A system and method for ascertaining the identity of an object within an enclosed article. The system includes an acquisition subsystem with a computed tomography machine and an alternate modality subsystem. The alternate modality subsystem includes a detector mounted to a rotatable gantry. The detector may be a quadrupole resonance unit, a dual energy x-ray unit, or a backscatter x-ray unit. The acquisition subsystem analyzes an article and distinguishes regions of interest (may contain contraband) from regions of no interest (do not contain contraband). The article is then transported to the alternate modality subsystem at which the detector further analyzes just the regions of interest.

25 Claims, 3 Drawing Sheets

U.S. PATENT DOCUMENTS

| | | |
|---|---|---|
| 6,574,299 B1 | 6/2003 | Katsevich |
| 6,789,941 B1 * | 9/2004 | Grady ........................ 378/197 |
| 6,816,571 B2 * | 11/2004 | Bijjani et al. .................. 378/57 |
| 6,839,406 B2 * | 1/2005 | Ries et al. ..................... 378/57 |
| 2002/0085674 A1 | 7/2002 | Price et al. |
| 2003/0072407 A1 | 4/2003 | Mihara et al. |
| 2004/0013225 A1 * | 1/2004 | Gregerson et al. ............ 378/19 |
| 2004/0252807 A1 * | 12/2004 | Skatter et al. .................. 378/57 |
| 2004/0258199 A1 * | 12/2004 | Ellenbogen et al. ........... 378/57 |

FOREIGN PATENT DOCUMENTS

| | | |
|---|---|---|
| EP | 1277439 | 1/2003 |
| GB | 1390575 | 4/1975 |
| WO | 99/67806 | 6/1998 |

* cited by examiner

CT-GUIDED SYSTEM AND METHOD FOR ANALYZING REGIONS OF INTEREST FOR CONTRABAND DETECTION

BACKGROUND

The invention relates generally to the detection of contraband located within articles. More particularly, the invention relates to the detection of objects considered illegal for transport that are hidden in luggage or mail parcels.

There has been and continues to be a demand for heightened security measures surrounding various communication and transportation avenues. For example, metal detectors and x-ray machines are standard security devices employed at airports for screening passengers and their carry-on luggage. The United States Postal Service also employs x-ray technology for screening parcels for mailing.

The capability for automatically screening luggage in a sufficiently efficient and cost-effective manner is currently non-existent. The screening systems currently in place record false positives at higher than desirable rates. The high number of false positives forces alternative follow-on inspections, such as trace detection or manual inspection of the luggage, thereby increasing the average screening time per bag substantially. There remains a need for a high throughput (e.g., at least one-thousand scanned checked bags per hour) automatic screening system for ascertaining whether a piece of luggage or a mail parcel contains an object which may be harmful, such as, for example, an explosive device or material.

SUMMARY

The present invention describes a system and a method for ascertaining whether contraband, for example, a harmful object such as an explosive device or material, is located within a closed article, such as a piece of luggage or a parcel.

One aspect of the invention is a system for detecting a contraband object within an article. The system includes an acquisition subsystem including a computed tomography scanner adapted to identify and distinguish regions of interest from regions of no interest within an article. The system also includes an alternate modality subsystem adapted to analyze the regions of interest to identify a contraband object.

Another aspect of the invention is a system for detecting an explosive within an article. The system includes an acquisition subsystem including a computed tomography scanner adapted to identify and distinguish regions of interest from regions of no interest within an article. The system also includes an alternate modality subsystem adapted to analyze the regions of interest to identify an explosive, wherein the alternate modality subsystem comprises a detector having a modality with a sensitivity complementary to the computed tomography scanner. Finally, the system includes a transportation means for transporting the article between the acquisition subsystem and the alternate modality subsystem.

Another aspect of the invention is a method for detecting a contraband object within an article. The method includes the steps of performing a computed tomography scan of the article with a computed tomography scanner, then, distinguishing regions of interest from regions of no interest within the article, and then, analyzing the regions of interest with a second modality having a sensitivity complementary to the computed tomography scanner to detect the contraband object.

Another aspect of the invention is a method for detecting an explosive within an article. The method includes the steps of performing a computed tomography scan of the article with a computed tomography scanner, then, distinguishing regions of interest from regions of no interest within the article, transporting the article through the computed tomography scanner to an alternate modality subsystem having a sensitivity complementary to the computed tomography scanner, and then, analyzing the regions of interest to detect the explosive.

These and other advantages and features will be more readily understood from the following detailed description of preferred embodiments of the invention that is provided in connection with the accompanying drawings.

DETAILED DESCRIPTION OF PREFERRED EMBODIMENTS

Figure 1:
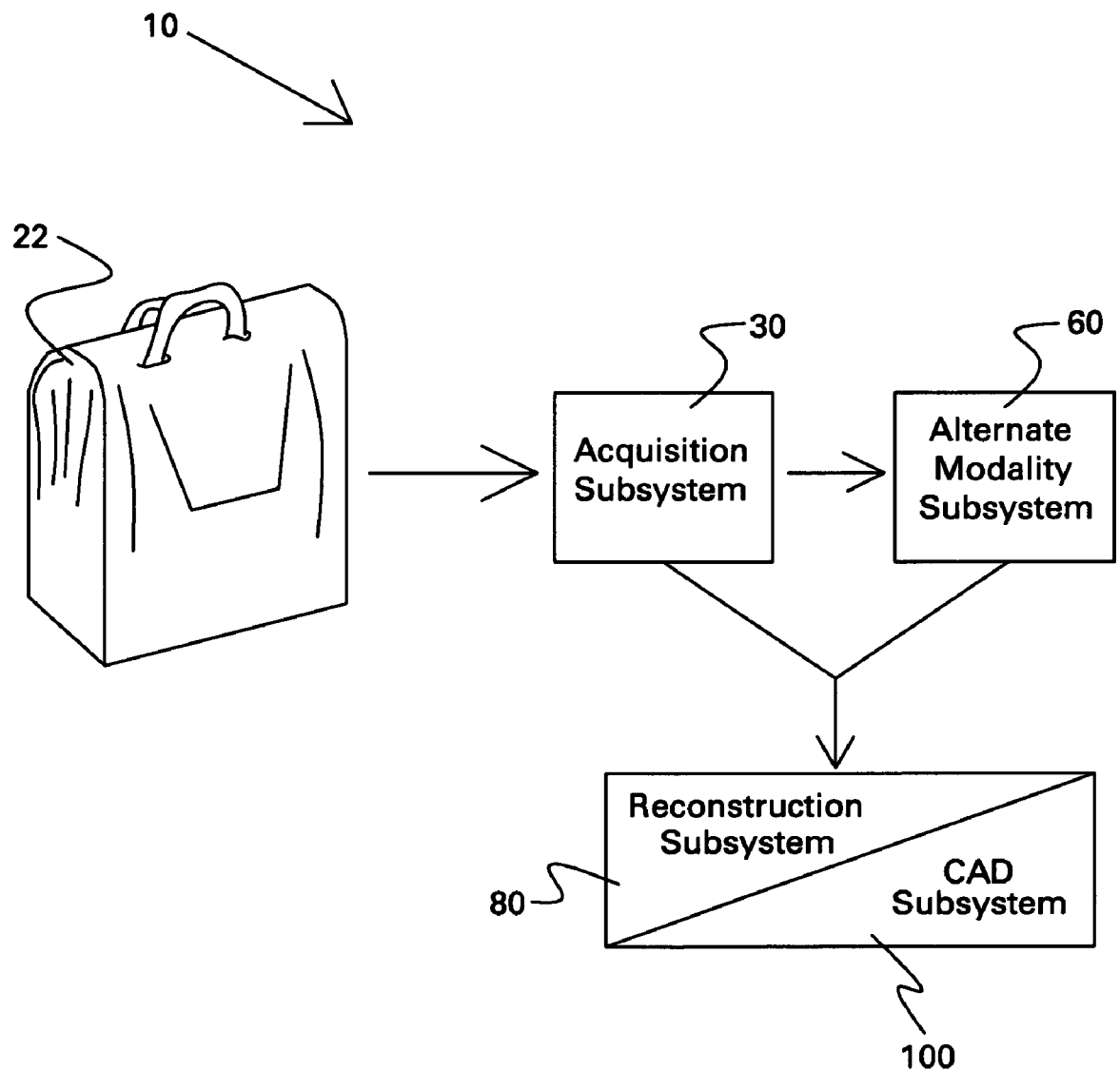
FIG. 1 is a schematic view of an object detecting system in accordance with an exemplary embodiment of the invention.

With reference to FIG. 1, an object detecting system 10 is schematically shown. The object detecting system 10 includes an acquisition subsystem 30, an alternate modality subsystem 60, a reconstruction subsystem 80, and a computer-aided detection (CAD) subsystem 100. The object detecting system 10 is adapted to accommodate a high throughput of articles 22, for example, screening of upwards of one thousand individual pieces of luggage 22 within a one hour time period, with a high detection rate and a tolerable number of false positives.

Figure 2:
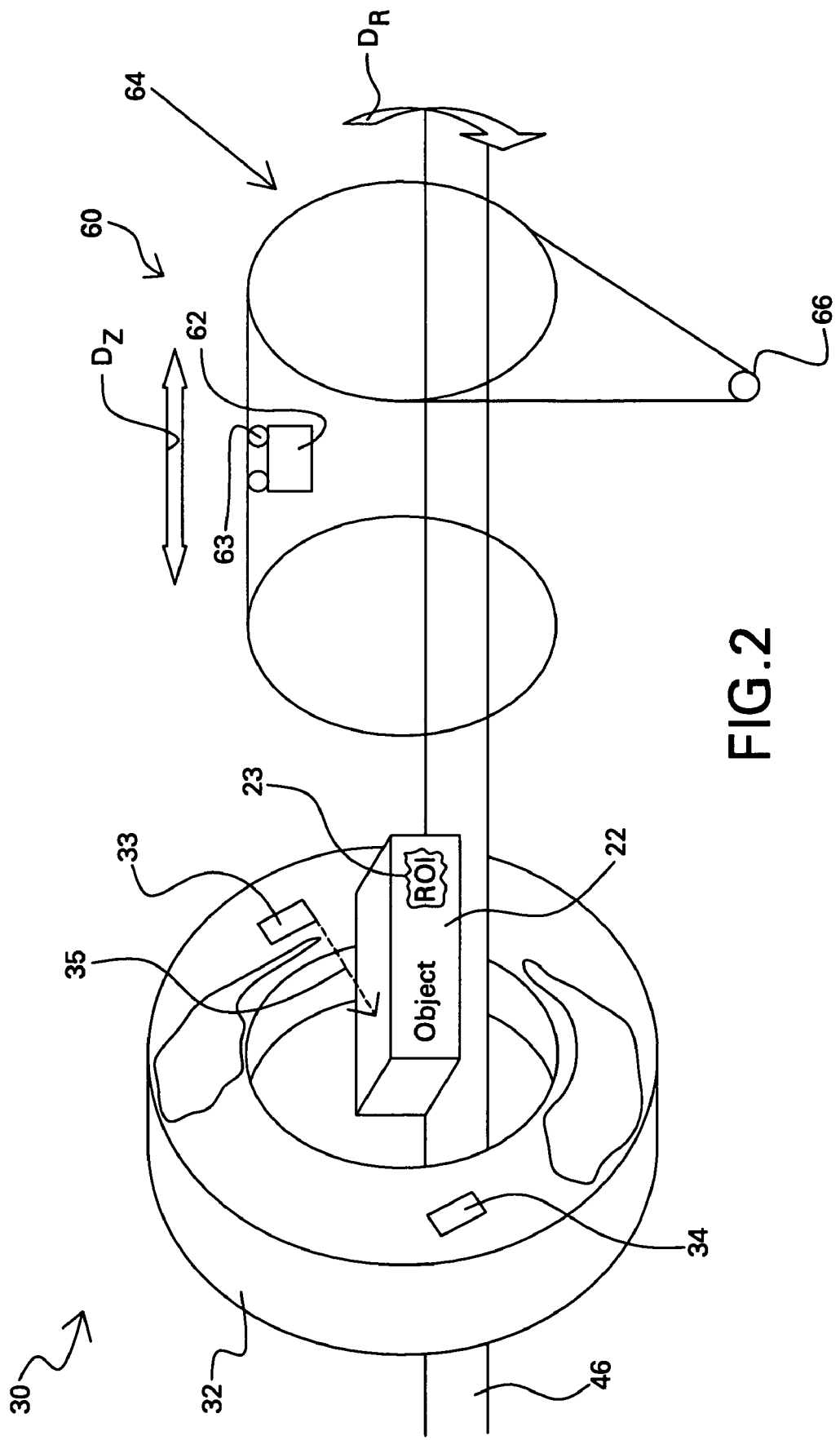
FIG. 2 is a schematic view of an exemplary embodiment of an acquisition subsystem for use in the object detecting system of FIG. 1.

FIG. 2 illustrates an embodiment of the acquisition subsystem 30 and the alternate modality subsystem 60 for use in the object detection system 10. The acquisition subsystem 30 includes a computed tomography (CT) scanner 32. The CT scanner 32 may include stationary radiation sources and detectors, or it may include rotating radiation sources and detectors, or a combination of stationary and rotating sources and detectors. As illustrated, the CT scanner 32 depicts a stationary radiation source 33 and a stationary detector 34. A conveyor belt 46 extends through the CT scanner 32, allowing the article 22 to be transported through the CT scanner 32. The radiation source 33 of the CT scanner 32 transmits x-ray beams 35 through the article 22 to the detector 34. The degree of attenuation of the x-ray beams 35 is detected by the detector 34 and provides generalized evidence of the type of material within the article 22.

The CT scanner 32 provides detailed spatial data, but since the scanner 32 is only looking at the attenuation of the x-ray beams 35 its singular use may lead to false positives. Through the scanning of the CT scanner 32, the large volume of the article 22 can be segmented and analyzed to ascertain regions of no interest from regions of interest, such as the region of interest (ROI) 23. A region of no interest is defined as an area within the article 22 that, according to an analysis of the data, based on properties such as mass and density extracted from the CT scanner 32, is unlikely to include any material that would be considered contraband, such as, for example, an explosive material or device. A region of interest, such as the region of interest 23, is defined as an area within the article 22 that, according to an analysis of the results of the CT scanner 32, may include a material or materials that appears to be contraband, and hence warrant further investigation.

The region of interest 23 makes up a subset of the entire volume making up the article 22. The identification of the region of interest 23 may be accomplished on the basis of density, mass, shape, location, or other properties that are determinable from a CT scan.

It should be appreciated that, although the CT scanner 32 is illustrated and described generically, the specific type of CT scanner 32 may vary. U.S. patent application Ser. No. 10/737,887, filed Dec. 15, 2003, includes a description of various CT scanners ($3^{rd}$ generation, $4^{th}$ generation, $5^{th}$ generation, and stationary CT (sCT) scanners) that may be suitable for the embodiments described herein. For example, suitable CT scanners 32 may include a $3^{rd}$ generation CT scanner, which is known in the art, a $4^{th}$ generation CT scanner, commercially available from American Science and Engineering, Inc., or a $5^{th}$ generation CT scanner, such as one marketed under the trademark IMATRON® by Imatron Inc. In addition, an sCT scanner, as described in U.S. patent application Ser. No. 10/737,887 may also be suitable. The U.S. patent application Ser. No. 10/737,887 is incorporated herein by reference in its entirety.

As described in U.S. patent application Ser. No. 10/737,887, one methodology for obtaining volumetric data from a three-dimensional computed tomography scanner is filtered back-projection. Filtered back-projection is a set of mathematical formulae that directly transform view data into an image representation. Beginning with the view data, numerous pre-processing steps that are mathematically prescribed may be performed to create a modified view data set. Then, a back projection is performed to modify the modified view data set into the image domain to obtain a cross-sectional image of the object scanned, or a volumetric representation of the object in the case of a three-dimensional acquisition (as would occur with an area or multi-slice detector).

Further, it should be appreciated that any other CT scanner capable of performing a three-dimensional scan of an article, such as, for example, a series of linear CT scanners disposed in multiple dimensions, may be suitable. A listing of the locations of any regions of interest 23 found within the article 22 by the CT scanner 32 is transmitted to a second analysis stage, namely the alternate modality subsystem 60. The alternate modality subsystem 60 has a modality with a sensitivity and selectivity complementary to those of the CT scanner 32 for examining only the regions of interest 23.

The illustrated alternate modality subsystem 60 includes a detector 62 that is movable in a direction $D_Z$, which is generally parallel to the direction of travel of the conveyor belt 46. As illustrated, the detector 62 is mounted on a sliding mechanism 63. It should be appreciated, that any suitable sliding mechanism for sliding the detector 62 in the direction $D_Z$, such as wheels or a linear bearing, may be utilized. The detector 62 is mounted on a rotating gantry 64 that rotates in the direction $D_R$ by means of a rotating drive 66, giving the detector 62 a complete, 360° mobility in all three axes around the article 22. It should be further appreciated that the sliding mechanism 63 may be omitted, instead utilizing the movement of the article 22 along the conveyor belt 46.

The detector 62 serves to further analyze the regions of interest 23 identified by the CT scanner 32. Specifically, the CT scanner 32 analyzes the volume of the article 22 by segmenting the volume of the article 22 and discerning probable material compositions of the objects located in each segment. A significant percentage of the volume of the article 22 will likely be considered a region of no interest. The remaining volume will be segmented into regions of interest 23. The locations of the regions of interest 23 are ascertained so that the detector 62 of the alternate modality subsystem 60 is enabled to analyze them.

The detector 62, illustrated schematically in FIG. 2, should be suitable for accurately analyzing data representative of a subset of the volume of the article 22. Since the amount of volume to be analyzed is lessened through the initial CT scan, the detector 62 can be a more time intensive scanning instrument. Specific types of alternate modality detectors 62 include a quadrupole resonance unit, a dual energy x-ray unit, and a backscatter x-ray unit. These modalities are complementary, in sensitivity and specificity properties, to those of the CT scanner 32.

The quadrupole resonance unit includes a set of coils through which the article 22 travels. The quadrupole resonance unit uses the magnetic field of the earth. The dual energy x-ray unit measures the x-ray attenuation from at least two energy bins in the x-ray spectrum. Each of these types of detectors 62 may be require increased time to analyze; however, as noted above, the increased analyzing time is compensated for by the lesser volume being analyzed.

Figure 3:
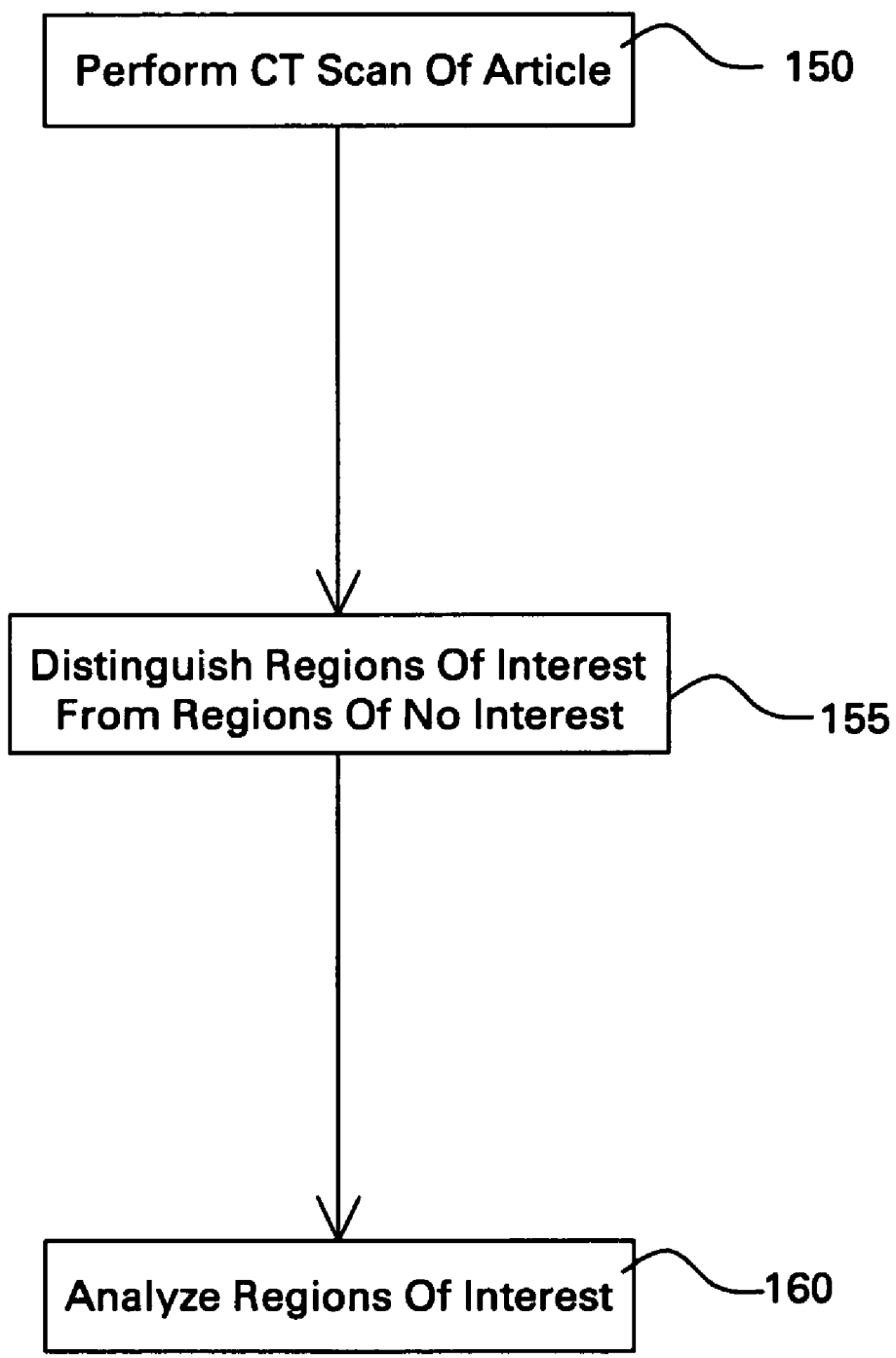
FIG. 3 illustrates process steps for identifying contraband hidden in an article in accordance with an embodiment of the invention.

Next will be described, with reference to FIGS. 1-3, a method for determining the presence of an object within an article 22. For sake of simplicity, the method will be directed to the detection of an explosive device or material within a piece of luggage 22. As the luggage 22 is transported through the acquisition subsystem 30, at Step 150 a CT scan of the luggage 22 is performed to create a plurality of data packets of view data. The view data is generated into discrete images of the luggage 22 through one of several reconstruction methodologies, such as, for example, filtered back-projection techniques, Radon-transform inversion techniques, iterative reconstruction, statistical reconstruction, or other multi-pass reconstruction techniques. The image data can be further analyzed until, at Step 155, regions of interest 23 are identified and distinguished from the regions of no interest.

Finally, at Step 160, a listing of the locations of any regions of interest 23 identified is transmitted to the alternate modality subsystem 60, and the luggage 22 is transported from the CT scanner 32 to the alternate modality subsystem 60 for an analysis of the regions of interest 23. The luggage 22 is moved along the conveyor belt 46 to a point within the alternate modality subsystem 60. Then, the detector 62 is moved in the directions $D_Z$ and $D_R$ to enhance the angle at which the detector 62 analyzes the regions of interest 23. Alternatively, the conveyor belt 46 may be moved in the direction $D_Z$ and the detector 62 may be moved only in the direction $D_R$. For example, any particular region of interest 23 may have a significantly smaller areal extent in one plane as opposed to another plane, such as, for example, an explosive substance formed into a sheet. The detector 62 is moved to place it into a position so that its analysis of the regions of interest 23 is enhanced by minimizing the dilution of information caused by partial volume effects. If the alternate modality subsystem 60 includes a quadrupole resonance unit, rotation of the detector 62 in the direction $D_R$ may be unnecessary, since quadrupole resonance is insensitive to angular orientation.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. For example, it should be appreciated that the article 22 may remain in motion with the conveyor belt 46 and the alternate modality subsystem 60 may move along the direction $D_Z$ with the article 22 instead of stopping the article 22 and the conveyor belt 46. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A system for detecting a contraband object within an article, comprising:
   an acquisition subsystem including a three dimensional computed tomography scanner that produced volumetric data;
   a reconstruction subsystem adapted to identify and distinguish regions of interest from regions of no interest within an article;
   and
   an alternate modality subsystem adapted to analyze the regions of interest to identify a contraband object, wherein the alternate modality subsystem does not comprise a computed tomography modality, wherein the alternate modality subsystem comprises a detector having a modality with a sensitivity complementary to the computed tomography scanner, wherein the detector comprises an x-ray system with dual energy capability.

2. The system of claim 1, wherein the computed tomography scanner comprises at least one from the group consisting of 3rd generation computed tomography scanners, 4th generation computed tomography scanners, 5th generation computed tomography scanners, stationary computed tomography scanners, and a series of linear computed tomography scanners.

3. The system of claim 1, wherein the alternate modality subsystem comprises a gantry upon which the detector is mounted and a sliding mechanism for sliding the detector along the gantry.

4. The system of claim 3, wherein the sliding mechanism comprises wheels.

5. The system of claim 3, wherein the sliding mechanism comprises a linear bearing.

6. The system of claim 1, wherein the alternate modality subsystem comprises a rotatable gantry upon which the detector is mounted.

7. The system of claim 6, wherein the alternate modality subsystem comprises a rotating drive for rotating the rotatable gantry.

8. The system of claim 1, further comprising a conveyor belt for transporting the article between the acquisition subsystem and the alternate modality subsystem.

9. The system of claim 8, wherein the alternate modality subsystem is adapted to move in a direction parallel to a direction of movement of the conveyor belt.

10. A system for detecting an explosive within an article, comprising:
    an acquisition subsystem including a computed tomography scanner that produces volumetric data and serving as a pre-scan modality;
    a reconstruction subsystem adapted to identify and distinguish regions of interest from regions of no interest within an article;
    an alternate modality subsystem adapted to analyze the regions of interest to identify an explosive, wherein the alternate modality subsystem comprises a detector having a modality with a sensitivity complementary to the computed tomography scanner; and wherein the alternate modality subsystem does not comprise a computed tomography scanner, wherein the detector comprises an x-ray system with dual energy capability; and
    a transportation means for transporting the article between the acquisition subsystem and the alternate modality subsystem.

11. The system of claim 10, wherein the computed tomography scanner comprises at least one from the group consisting of $3^{rd}$ generation computed tomography scanners, $4^{th}$ generation computed tomography scanners, $5^{th}$ generation computed tomography scanners, stationary computed tomography scanners, and a series of linear computed tomography scanners.

12. The system of claim 10, wherein the alternate modality subsystem comprises a gantry upon which the detector is mounted and a sliding mechanism for sliding the detector along the gantry.

13. The system of claim 12, wherein the sliding mechanism comprises wheels.

14. The system of claim 12, wherein the sliding mechanism comprises a linear bearing.

15. The system of claim 10, wherein the alternate modality subsystem comprises a rotatable gantry upon which the detector is mounted.

16. The system of claim 15, wherein the alternate modality subsystem comprises a rotating drive for rotating the rotatable gantry.

17. A method for detecting a contraband object within an article, comprising:
    performing a computed tomography scan of the article with a three-dimensional computed tomography scanner that produces volumetric data;
    then, distinguishing regions of interest from regions of no interest within the article through computed tomography reconstruction; and
    then, analyzing the regions of interest with a second modality having a sensitivity complementary to the compute tomography scanner to detect the contraband object, wherein the second modality does not comprise computed tomography,
    wherein the analyzing step is accomplished with an alternate modality subsystem comprising a detector, wherein the detector comprises an x-ray system with dual energy capability.

18. The method of claim 17, further comprising transporting the article through the computed tomography scanner.

19. The method of claim 17, wherein the detector is moved relative to the article to enhance the capability of the detector to distinguish regions of interest within the article.

20. The method of claim 17, wherein the detector is mounted upon a rotatable gantry, enabling the detector to be rotated around the article.

21. The method of claim 17, further comprising listing the regions of interest and transmitting the listing to the alternate modality subsystem.

22. A method for detecting an explosive within an article, comprising:
    performing a computed tomography scan of the article with a computed tomography scanner that produces volumetric data;
    then, distinguishing regions of interest from regions of no interest within the article through computed tomography reconstruction;
    transporting the article through the computed tomography scanner to an alternate modality subsystem having a sensitivity complementary to the compute tomography scanner; and then, analyzing the regions of interest with the alternate modality subsystem without tomography reconstruction to detect the explosive,
wherein the alternate modality subsystem includes a detector mounted on a gantry and wherein the detector comprises an x-ray system with dual energy capability.

23. The method of claim 22, further comprising listing the regions of interest and transmitting the listing to the alternate modality subsystem.

24. The method of claim 22, wherein the detector is moved relative to the article to enhance the capability of the detector to distinguish regions of interest within the article.

25. The method of claim 24, wherein the detector is mounted on a rotatable gantry, enabling the detector to be rotated around the article.

* * * * *

UNITED STATES PATENT AND TRADEMARK OFFICE
CERTIFICATE OF CORRECTION

PATENT NO. : 7,609,807 B2  
APPLICATION NO. : 10/779084  
DATED : October 27, 2009  
INVENTOR(S) : Leue et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 0 days.

Signed and Sealed this

Twelfth Day of October, 2010

David J. Kappos  
*Director of the United States Patent and Trademark Office*